United States Patent
Catterton et al.

(10) Patent No.: US 6,231,663 B1
(45) Date of Patent: May 15, 2001

(54) METHOD FOR NEW CONCRETE FROM OLD CONCRETE

(76) Inventors: Robert L. Catterton, 3639 Branhum St., Edgewater, MD (US) 21037; Tony H. Harris, 7335 St. Marys Ave., LaPlata, MD (US) 20646

( * ) Notice: Subject to any disclaimer, the term of this patent is extended or adjusted under 35 U.S.C. 154(b) by 0 days.

(21) Appl. No.: 09/641,133

(22) Filed: Aug. 16, 2000

Related U.S. Application Data

(63) Continuation-in-part of application No. 09/494,163, filed on May 16, 2000.

(51) Int. Cl.[7] ............................. C04B 18/04; C04B 14/04
(52) U.S. Cl. ..................... 106/705; 106/668; 106/708; 106/697; 106/738; 106/816; 106/817; 106/819; 106/823

(58) Field of Search ................................ 106/668, 705, 106/708, 713, 697, 737, 738, 816, 817, 819, 823

(56) References Cited

U.S. PATENT DOCUMENTS

| 5,236,500 | * | 8/1993 | Schneider et al. | 106/705 |
| 5,328,508 | * | 7/1994 | Lin | 106/738 |
| 5,725,655 | * | 3/1998 | Catterton et al. | 106/738 |

* cited by examiner

Primary Examiner—Michael Marcheschi

(57) ABSTRACT

A method is described for making concrete mixture by blending new batch cement and fly ash with recycled concrete material (curb & gutter, sidewalk, brick, block, asphalt & various other concrete items). This new process will enable discarded concrete materials to be reused as a valuable product.

4 Claims, No Drawings

METHOD FOR NEW CONCRETE FROM OLD CONCRETE

This application is a continuation-in-part of application Ser. No. 09/494,163, filed May 16, 2000.

SUMMARY OF INVENTION

In accordance with the invention, this process takes old concrete, sidewalk, paving, curb, etc. and reuses it to produce a new concrete mixture that is comparable to concrete made with virgin materials. Instead of the old materials being discarded, filling our already limited landfills, they are recycled into a useful and valuable product. Not only will the new concrete mixture create more by volume per weight by using less material in production, but will also be produced at a substantially cheaper cost, enabling this product to be offered on the market, to the consumer, at a reduced rate.

FIELD OF INVENTION

The process relates to an improved usable concrete material, which can be made with less virgin aggregates, by utilizing recycled concrete material and fly ash. Less material is needed to make the same volume of concrete mixture, which is cost effective to produce and just as workable and durable as a virgin concrete.

BACKGROUND OF THE INVENTION

Concrete is a building material made by mixing cement, fine and coarse aggregates in water. The gathering of old concrete, asphalt, brick, block, sand, gravel and other grit type materials normally out of specification in its present state. The old concrete, asphalt, brick, sand, gravel and other grit material being crushed and sized does not have to be any minimum compressive strength to be mixed with new concrete and fly ash. Once virgin concrete is mixed, poured and set, it is unable to be reused for any other purpose, it must then be discarded (most likely to a landfill dump) and replaced with new virgin concrete again. However, by utilizing the crushed recycle method, as described within, the old discarded set concrete can actually be reused in making new concrete mixture. This method will also cut down substantially on the amount of virgin materials needed, not to mention the expense and wastefulness of disposing old concrete in a landfill. By production standards, this method will prove to be not only less expensive to the consumer, but will also preserve our natural resources, a precious commodity. The coarse aggregate used in present invention consists of a mixture of recycled concrete having a size of ¼ to 200 mesh and recycled concrete having a size of 1" to 4 mesh, recycled concrete having a size of ¾" to 4 mesh and recycled concrete having a size of ½" to 4 mesh. The composition according to the present indication can also be bagged.

The following three tables show various concrete compositions and their respective compressive strengths.

The concrete composition has a 28 day composition strength of at most 5070 PSI and a 21 day strength of at least 4093 PSI.

TABLE 1

| TEST # | COMPRESSIVE STRENGTH (lbs.) | DESCRIPTION |
|---|---|---|
| 1 | 1010 | 154 lbs RC6/28 lbs. CEMENT |
| 2 | 1150 | 154 lbs. RM6/28 lbs. CEMENT |
| 3 | 890 | 154 lbs. RM6/28 lbs. CEMENT |
| 4 | 1220 | 70 lbs. RC6/14 lbs. CEMENT |
| 5 | 1210 | 154 lbs. RC6/28 lbs. CEMENT |
| 6 | 1390 | 154 lbs RC6/28 lbs. CEMENT |
| 7 | 2140 | 105 lbs RC6/26.5 lbs. CEMENT |
| 10 | 1870 | 87.9 lbs. RC6/27 lbs. CEMENT (wet test) |
| 11 | NO TEST | 48.6 lbs. RC57/62 lbs. SAND/27 lbs. CEMENT |
| 12 | 2960 | 48.6 lbs RC57(washed)/62 lbs. SAND/27 lbs. CEMENT |
| 13 | 2130 | 88 lbs. RC6/27 lbs. CEMENT |

**Various concrete compositions were made as described in TABLE 1.

TABLE 2

| TEST # | @ 7 Days COMPRESSIVE STRENGTHS | Approx. 21 Days | DESCRIPTION |
|---|---|---|---|
| 1 | 1010 | 1710 | 154 lbs RC6/28 lbs. CEMENT |
| 2 | 1150 | 1720 | 154 lbs. RM6/28 lbs. CEMENT |
| 3 | 890 | 1260 | 154 lbs. RM6/28 lbs. CEMENT |
| 6 | 1390 | 2200 | 154 lbs. RC6/28 lbs. CEMENT |
| 7 | 2140 | 1720 | 105 lbs. RC6/26.5 lbs. CEMENT |
| 8 | 4230 | 5110 | 62 lbs. SAND/90 lbs. GRAVEL/26.5 CEMENT |
| 9 | 4430 | 5410 | 65 lbs. SAND/90 lbs BLUE STONE #57 26.5 CEMENT |
| 10 | 1870 | 2340 | 87.9 lbs RC6/27 lbs CEMENT (wettest) 48.6 lbs. RC57 (washed/62 lbs SAND |
| 12 | 2960 | 4090 | 27 lbs. CEMENT |
| 13 | 2130 | 2870 | 88 lbs. RC 6/27 lbs. CEMENT |

**Various concrete compositions were made as described in TABLE 2. Test #8 and Test #9 are comparative samples using virgin aggregate.

*RC6 is recycled material having a 1½" to 200 mesh.

*RM6 is recycled material having a 1½" to 200 mesh.

*RC57 is recycled material having a 1" to 4 mesh.

*RCPea is recycled material having a ½" to 200 mesh.

*RC1/4 is recycled material having a ¼" to 200 mesh.

TABLE 3

Test Pour of February 24, 1999

| TEST # | @ 7 Days COMPRESSIVE STRENGTHS | @ 28 Days | DESCRIPTION |
|---|---|---|---|
| 14 | 530 | 810 | 60 lbs RC6/1.3 lbs. FLY ASH/10.3 lbs. CEMENT |
| 15 | 1680 | 2830 | 26.6 lbs. RC57/20 lbs. SAND/4.6 lbs. FLY ASH/8.8 lbs. CEMENT |
| 16 | 1290 | 1950 | 30 lbs. RC6/13.3 lbs. SAND/8.8 lbs CEMENT |
| 17 | 2940 | 4240 | 26.6 lbs. C\RC57/23.3 lbs. SAND/10.0 lbs. CEMENT |
| 18 | 1410 | 1700 | 31.6 lbs. RC6/16.6 lbs. SAND/10.0 lbs. CEMENT |
| 19 | 4280 | 5550 | 26 lbs. RC57/49 lbs. SAND/15 lbs. CEMENT |
| 20 | 3900 | 4680 | 49 lbs. RCPea/26 lbs. SAND/1.3 lbs. FLY ASH 10 lbs. CEMENT |
| 21 | 4480 | 5070 | 49 lbs. RCPea/26 lbs. SAND/16 lbs. CEMENT |

TABLE 3-continued

Test Pour of February 24, 1999

| TEST # | @ 7 Days COMPRESSIVE | @ 28 Days STRENGTHS | DESCRIPTION |
| --- | --- | --- | --- |
| 22 | 2750 | 3640 | 45 lbs. RC1/2-#200/26 lbs. SAND/1.3 lbs FLY ASH/10 lbs. CEMENT |
| 23 | 2260 | 3240 | 49 lbs. RC1/2-#200/26 lbs. SAND/10 lbs. CEMENT |
| 24 | 2750 | 3240 | 29 lbs. RC57/16 lbs. SAND/11 lbs. CEMENT |
| 25 | 2760 | 3280 | 28 lbs. RC1/4-#200/16 lbs. SAND/11 lbs. CEMENT |
| 26 | 4030 | 5070 | 40 lbs. RC1/4-#200/4 lbs. SAND/13 lbs. CEMENT |
| 27 | 4020 | 5070 | 28 lbs RC1/4-#200/16 lbs. SAND/17 lbs. CEMENT |

\*\*Various concrete compositions were made as described in TABLE 3.

\*RC6 is recycled material having a 1½" to 200 mesh.
\*RM6 is recycled material having a 1½" to 200 mesh.
\*RC57 is recycled material having a 1" to 4 mesh.
\*RCPea is recycled material having a ½" to 200 mesh.
\*RC1/4 is recycled material having a ¼" to 200 mesh.

What we claim is:

1. A concrete composition consisting of portland cement, fly ash, sand, water and a coarse aggregate, wherein the coarse aggregate consists of a mixture of (a) recycled concrete having a size of 1½" to 200 mesh (b) recycled concrete having a size of ½" to 200 mesh, (c) recycled concrete having a size of 1" to 4 mesh (d) recycled concrete having a size of ¾" to 4 mesh and (e) recycled concrete having a size of ½" to 4 mesh, and (f) recycled asphalt said composition having 28 day compressive strength of at most 5070 PSI and a 21 day strength of at least 4093 PSI.

2. A bagged concrete composition consisting of portland cement, fly ash, sand and a coarse aggregate, wherein the coarse aggregate consists of a mixture of (a) recycled concrete having a size of 1½" to 200 mesh (b) recycled concrete having a size of 1" to 4 mesh (c) recycled concrete having a size of ¾" to 4 mesh, (d) recycled concrete having a size of ½" to 200 mesh, (e) recycled concrete having a size of ½" to 4 mesh and (f) recycled asphalt, said composition having a 28 day compressive strength of at most 5070 PSI and a 21 day strength of at least 4093 PSI.

3. A concrete composition consisting of portland cement, fly ash, sand, water and a coarse aggregate, wherein the coarse aggregate consists of a mixture of (a) recycled concrete having a size of ¼" to 200 mesh, (b) recycled asphalt, said composition having 28 day compressive strength of at most 5070 PSI and a 21 day strength of at least 4093 PSI.

4. A bagged concrete composition consisting of portland cement, fly ash, sand and a coarse aggregate, wherein the coarse aggregate consists of a mixture of (a) recycled concrete having a size of ¼" to 200 mesh (b) recycled asphalt, said composition having a 28 day compressive strength of at most 5070 PSI and a 21 day compressive strength of at least 4093 PSI.

\* \* \* \* \*